United States Patent [19]

Uhrick

[11] Patent Number: 4,683,839
[45] Date of Patent: Aug. 4, 1987

[54] COMBINATION OF A TABLE AND EQUIPMENT FOR CAT LITTER

[76] Inventor: Richard G. Uhrick, 4102 Glenview Ct., Fort Wayne, Ind. 46815

[21] Appl. No.: 733,602

[22] Filed: May 13, 1985

[51] Int. Cl.⁴ .............................................. A01K 23/00
[52] U.S. Cl. ...................................................... 119/1
[58] Field of Search ............................................ 119/1

[56] References Cited

U.S. PATENT DOCUMENTS

| | | | |
|---|---|---|---|
| 3,358,647 | 12/1967 | Wilson | 119/1 |
| 3,872,832 | 3/1975 | Quinn | 119/1 |
| 4,348,982 | 9/1982 | Selby | 119/1 |
| 4,352,340 | 10/1982 | Strubelt | 119/1 |

Primary Examiner—Robert Peshock
Attorney, Agent, or Firm—Jeffers, Irish & Hoffman

[57] ABSTRACT

The subject invention involves a combination of a table constituting a support comprising a top, framework forming a compartment and legs which define a relatively large unobstructed center area or space and the litter equipment which is substantially arranged or confined in that space.

More particularly, the equipment for litter comprises a relatively large plastic bag and receptacle of appropriate size containing litter which is placed in the bottom of the bag, and the bag is also provided with an opening through which a cat may enter into the receptacle and exit therefrom. The bag is preferably transparent or translucent and its upper extremity is preferably detachably connected at several locations in order to stabilize or support the bag in an upright condition in the central space or area of the support or table.

One component of the equipment and/or support is a tablecloth, cover or drape, preferably one reaching to the floor, which serves to cover and conceal the support and the litter equipment. The cover is preferably made of a suitable flexible or resilient opaque material and a front wall thereof is cut or slit about twelve (12) inches from its bottom to provide folds or flaps which can be spread apart by a cat to provide an entrance to the opening in the bag and to the receptacle.

The closing of the entrance by one or more portions of the tablecloth is automatic whenever a cat passes through the entrance and this insures complete concealment of the table and equipment irrespective whether a cat is in or out of the bag.

18 Claims, 8 Drawing Figures

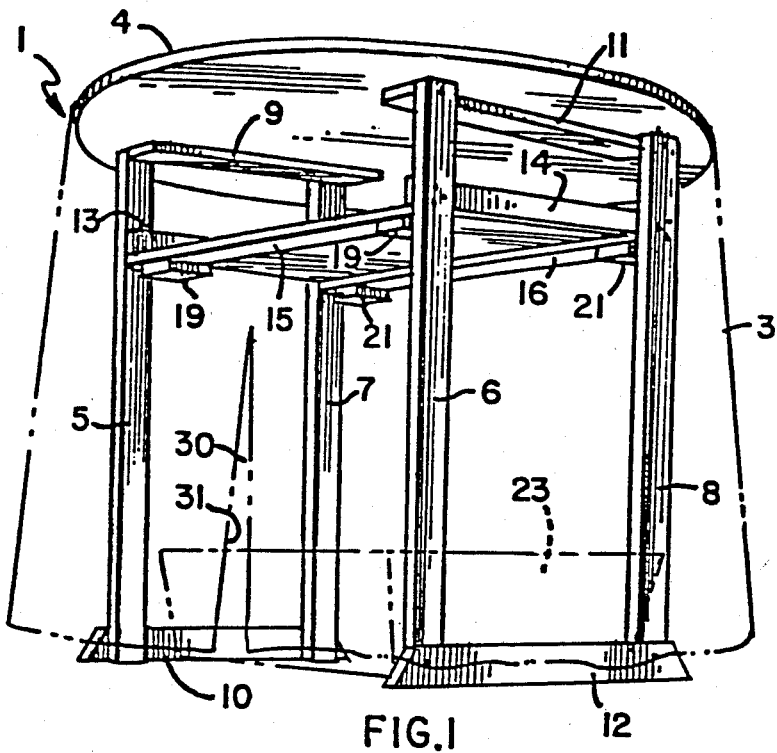
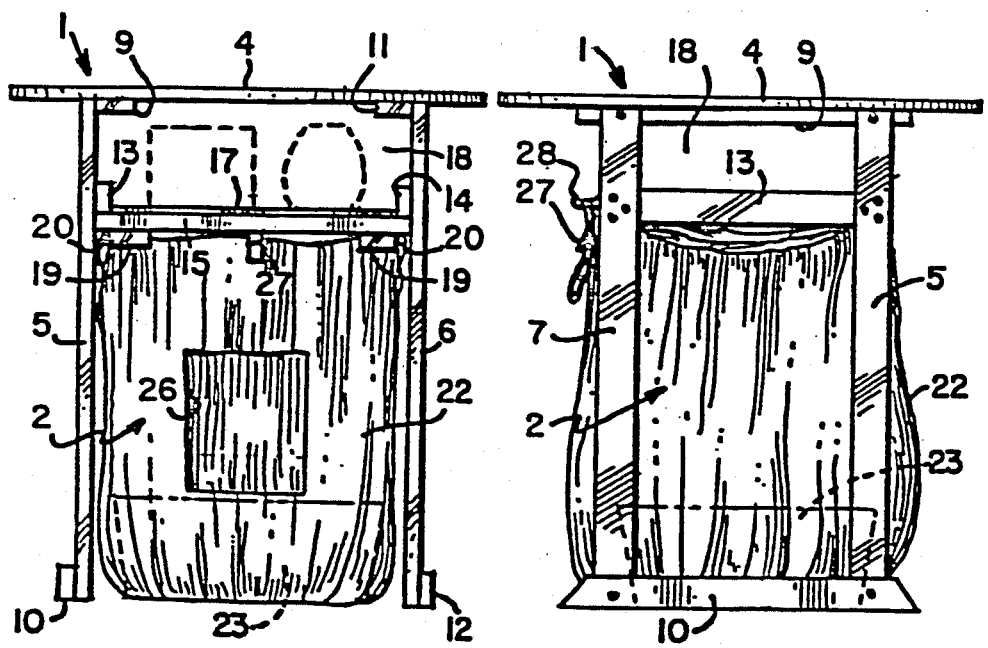

COMBINATION OF A TABLE AND EQUIPMENT FOR CAT LITTER

BACKGROUND OF THE INVENTION

Aside from a yard which is the best suitable place for the natural excrement of cats, for those which are generally housed inside, provision for their litter is usually provided by placing a receptacle containing litter on a few pages of newspaper on a floor in a remote untravelled area of a house. This conventional setup is unsightly and unsanitary.

OBJECTIVES OF THE INVENTION

As alluded to in the Abstract, the invention involves a support having a central unobstructed area and equipment for cat litter which is confined in the area, and a cover or drape which conceals both the support and the equipment.

A particular object of the invention is to provide a table incorporating cat litter equipment, the table being stable or strong enough to support such items as lamps, a telephone, vases, pictures, stereo, television or any number of household items. The long tablecloth covers the table and litter equipment and this feature complementing the others makes for more agreeable living in close confinement with cats.

More particularly, an object of the invention is to provide a table or stand having a top, and framework forming a compartment and legs which define a relatively large center open area below the compartment. The framework adjacent to the compartment is also preferably provided with four corresponding connection means.

A significant objective of the invention is to provide equipment for cat litter embodying improved principles of design and construction which preferably comprises an open top elongated transparent or translucent plastic bag which has a removable receptacle containing litter located in the bottom of the bag. The upper marginal edge defining the open top of this bag is manually adjusted and detachably connected to the connection means, above referred to, to stabilize and/or maintain the bag in an upright condition in the central area of the support. The front wall of the bag is provided with a relatively large opening through which a cat may readily enter and leave the bag and receptacle.

Another but very important object of the invention is to provide a tablecloth, cover or drape which is designed and constructed to conceal both the support and the litter equipment. A wall of the cover is preferably cut at a location, in a juxtaposed relation opposite the opening in the bag so as to provide what may be defined as a primary entrance whereby when a wall or portions thereof or flaps formed by the cut are pushed aside by the cat's nose or paw to seek entry into the bag opening and receptacle the primary entrance will automatically close after a cat passes through this entrance.

An additional object of the invention is to provide a bag and receptacle which can be readily removed as a unit from the connection means so that the receptacle can be taken from the bag to release excrements and litter into the bag for appropriate deposit and whereby a new or old receptacle containing litter can be placed in a new bag for ready mounting for use whereby to promote sanitation.

Another objective of the invention is to provide a combination which may be designed and constructed in sections for shipment and then reassembled when ready for use and one which is relatively light in weight and can be easily manually moved with a minimum of effort.

Additional objects and advantages of the invention will become apparent after the description hereinafter set forth is considered in conjunction with the drawings annexed hereto.

DRAWINGS

FIG. 1 is a pictorial view of support or table and where the location of a receptacle for cat litter would be in the confines of a central area of the support and the position a tablecloth would assume to conceal the table and receptacle;

FIG. 2 is a front elevational view of the table showing a compartment and a bag supported in the central area of the table and an opening in the bag for access to a receptacle in the bottom of the bag;

FIG. 3 is a side elevational view of the table with the bag and receptacle in a position for use;

Figure 4:
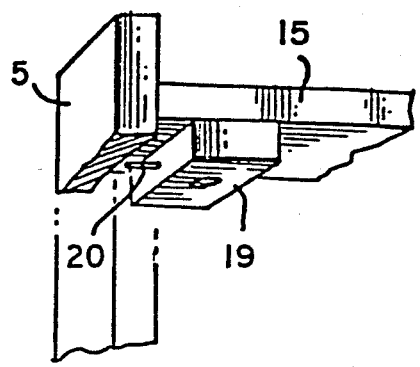
FIG. 4 is a partial view of the framework showing a detail of one of the four identical connection means employed to support the bag.
Figure 5:
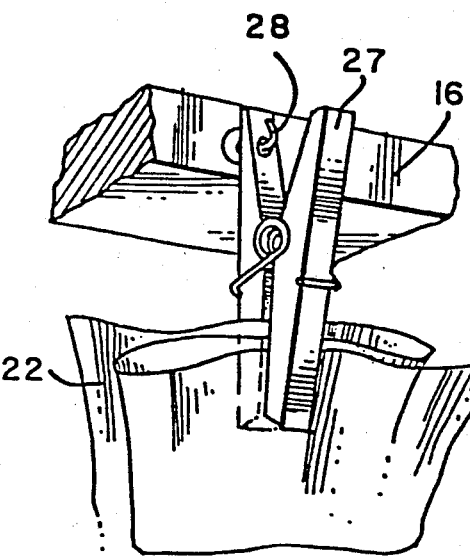
FIG. 5 is a partial view illustrating a dual purpose clip supporting the rear side of the bag.
Figure 6:
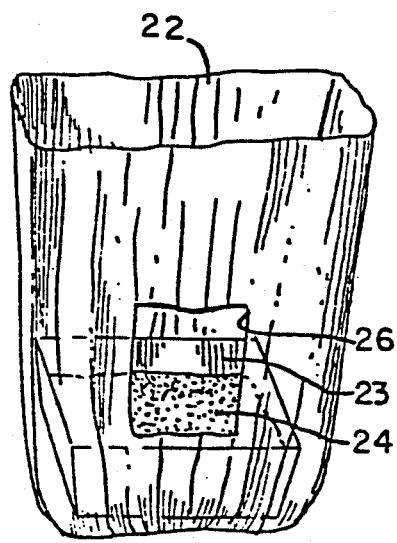
FIG. 6 depicts the bag and receptacle therein.
Figure 7:
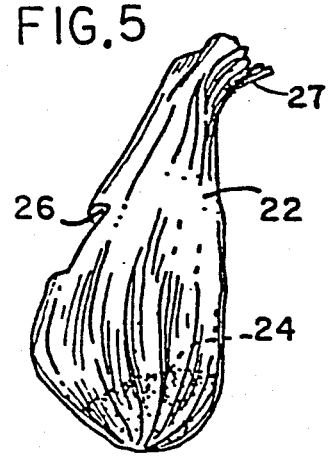
Figure 8:
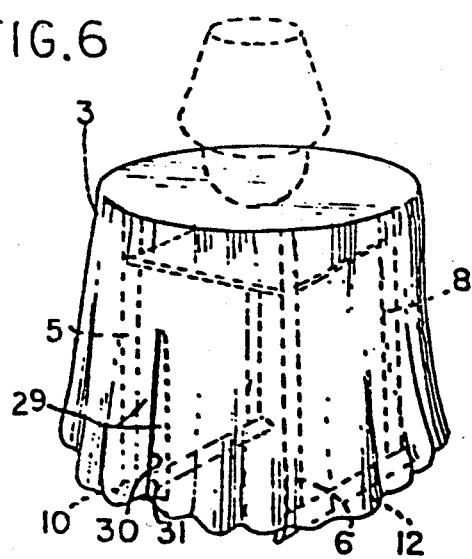

FIG. 7 shows the bag with contents of the receptacle to be held therein by the clip shown in FIG. 5 ready for disposal; and FIG. 8 illustrates the table and the tablecloth in which the front area of the latter opposite the opening in the bag is designed and constructed to be opened by the nose or paw of a cat to provide an entrance through which the cat can enter the receptacle and whereby the material of the cloth forming the front area will automatically close the entrance when a cat passes through.

Referring to the drawings, and particularly to FIGS. 1, 2 and 3, numeral 1 generally represents a support which is preferably illustrated as being a table, 2 generally represents equipment for cat litter, and 3 represents a tablecloth, cover or drape.

The support or table comprises a round top 4, framework which includes a pair of front legs 5 and 6 and a pair of rear legs 7 and 8. The upper ends of the front and rear legs 5 and 7 are attached to a cleat 9 which is secured to the underside of the table top and the bottom end of these legs are secured to a bottom rest 10. The upper ends of the front and rear legs 6 and 8 are similarly attached to a cleat 11 secured to the bottom of the top and their lower ends to a rest 12.

The legs 5 and 7 are also secured together intermediate their lengths by an inner side rail 13 and the legs 6 and 8 are correspondingly secured together by an inner rail 14. Front and rear bridge member 15 and 16, as depicted in FIGS. 1 and 2, are connected to the inner side rails and/or the legs and a sheet of corrugated board 17, or other suitable light but sufficient material is placed on the bridge members whereby to provide a compartment 18 directly below the top 4 for items as shown in FIG. 2.

Secured adjacent to the bottom of the ends of the front bridge member 15 are blocks 19 which are respectively provided with connection means preferably in the form of pintles 20. The rear bridge 16 carries a pair of blocks 21 similar to the block 19 and provided with connection means preferably in the form of pintles like 20. These pintles, four in number, are identical and serve to support the front and side walls of the bag as will be described subsequently.

The support or framework described above defines an unobstructed central area or void and in this area is confined the equipment 2 for cat litter constituting a unique combination as will be defined in the claims.

The equipment 2 for cat litter preferably comprises an enlarged transparent or translucent bag 22 generally rectangular in shape and a generally rectangular receptacle 23 which is seated in the bottom of the bag. Litter 24 in sufficient quantity is placed in the receptacle. The front wall or portion of 25 of the bag is preferably provided with a rectangular opening 26 at a convenient height in relation to a rim of the receptacle to facilitate entry of a cat into the receptacle.

The side walls of the receptacle 23 preferably have a snug or frictional fit with the walls of the bag so that litter will not escape between the receptacle and walls of the bag.

The bag is preferably constructed of a 5 mil. polyethylene plastic which measures 15"×18"×24" and the bag has a 7"×8" opening adjacent one end.

The bag is preferably held in an upright position by opening the bag and manipulating its upper extremity so that its upper marginal edge portions are detachably connected to the four connective means or pintles 20 by piercing pintles through the bag. The lower extremity of the bag preferably rests on a floor due partly to the weight of the receptacle and the mode of connecting the upper extremity to the pintles. This unique mode of mounting the bag is inexpensive but very efficient.

It is desirable in installing the bag and receptacle that the front and side portions of the bag be connected to the pintles in a taut condition whereby the bag is held upright in a stable position and improve its appearance. Any surplusage of material of the rear wall can be secured in folds by a dual purpose clip 27 which is detachably attached to the rear bridge member 16 by a hook 28 as shown in FIG. 5.

The clip 27 is utilized to support the rear side of the bag in an upright stable condition and is also employed by detaching it from the hook 28 and using it to hold the bag in a wrapped condition for depositing the litter and excrement.

As shown in FIG. 8 the frontal area of the tablecloth is designed and constructed to provide a surplusage of material or folds 29 and a slit 30 preferably 12" high extending upwardly from the bottom of the cloth whereby the slit when parted by the nose or paw of a cat will open to provide an entrance 31 affording access to the opening 26 and the receptacle 28. The opening 26 and entrance are arranged in a juxtaposed or closely adjacent positions in order to facilitate passage of a cat into and out of the receptacle via the entrance and opening. The folds 29 are so formed that after a cat passes through the entrance 31 one or both folds 29 will automatically close the entrance and thereby conceal both the table and litter equipment and promote the appearance and sanitary aspects of the combination.

Having thus described my invention or inventions, it is obvious that various modifications or addition to those described may be made in the same without departing from the spirit of the invention and, therefore, I do not wish to be understood as limiting myself to the exact forms, constructions, arrangements, and combinations of the components herein shown and described.

I claim:

1. In combination: a table having a top and framework comprising a compartment and legs defining an unobstructed central area and equipment for cat litter comprising a bag supported substantially in said central area for receiving a receptacle adapted to contain litter and provided with an opening affording access to such a receptacle, and a tablecloth mounted on said top serving to conceal said table and equipment, said tablecloth having a wall of which at least a portion thereof can be moved aside by a cat to provide an entrance to said opening and will automatically close the entrance after a cat travels either way therethrough.

2. A support having a framework providing a compartment and legs defining an unobstructed central area, connection means provided adjacent the corners of said compartment, an upper open extremity of a plastic bag directly connected to said connection means for maintaining a lower extremity of the bag in a predetermined condition adjacent a floor, a receptacle for containing litter located in said lower extremity for resting its weight on the floor, and an opening in the bag through which a cat may enter and leave the receptacle.

3. A table and cat litter equipment combination comprising:
   a table including a top supported by a plurality of legs;
   a compartment below said top connected to said table;
   a bag having an open end, said bag detachably connected substantially near said open end to said table below said compartment and located substantially within an unobstructed area defined by said legs and compartment;
   a receptacle for containing litter within said bag; and
   an opening in said bag whereby a cat may enter and leave said bag.

4. The combination of claim 3 wherein said top is substantially circular.

5. The combination of claim 3 wherein said compartment is a shelf made of a substantially flat sheet connected to said legs.

6. The combination of claim 3 further comprising a tablecloth for placement over said table, compartment, and bag below said table, said tablecloth having a slit to be situated substantially adjacent to said opening whereby the passage of a cat into said bag is facilitated.

7. The combination of claim 3 wherein said bag is translucent for allowing light to enter said bag.

8. The combination of claim 3 wherein said detachable connection comprises a plurality of pintle assemblies connected to said table, each of said assemblies including a pintle for piercing said bag and thereby securing said bag thereto.

9. A table and cat litter equipment combination comprising:
   a table including a top supported by a plurality of legs;
   a bag having an open end, said bag detachably connected substantially near said open end to said table below said top and located substantially within an unobstructed area defined by said legs;
   wherein said detachable connection includes a plurality of pintle assemblies connected to said table, each of said assemblies including a pintle for piercing said bag and thereby securing said bag thereto;
   a receptacle for containing litter within said bag; and
   an opening in said bag whereby a cat may enter and leave said bag.

10. The combination of claim 9 wherein said top is substantially circular.

11. The combination of claim 9 further comprising a shelf made of a substantially flat sheet connected to said legs and defining a storage compartment.

12. The combination of claim 9 further comprising a tablecloth for placement over said table and said bag below said table, said tablecloth having a slit to be situated substantially adjacent to said opening whereby the passage of a cat into said bag is facilitated.

13. The combination of claim 9 wherein said bag is translucent for allowing light to enter said bag.

14. A table and cat litter equipment combination comprising:
- a table including a substantially circular top supported by a plurality of legs;
- a compartment below said top connected to said table;
- a translucent bag having an open end, said bag detachably connected substantially near said open end to said table below said compartment and located substantially within an unobstructed area defined by said legs and compartment;
- a receptacle for containing litter within said bag;
- an opening in said bag whereby a cat may enter and leave said bag; and
- a tablecloth for placement over said table, compartment, and bag below said table, said tablecloth having a slit to be situated substantially adjacent to said opening whereby the passage of a cat into said bag is facilitated.

15. The combination of claim 14 wherein said compartment is a shelf made of a substantially flat sheet connected to said legs.

16. The combination of claim 14 wherein said detachable connection comprises a plurality of pintle assemblies connected to said table, each of said assemblies including a pintle for piercing said bag and thereby securing said bag thereto.

17. In combination: a table having a top and framework comprising a compartment and legs defining an unobstructed central area and equipment for cat litter comprising a bag mounted substantially in said central area, a receptacle in said bag adapted to contain litter, said bag being provided with an opening affording access to said receptacle, and a tablecloth mounted on said top serving to conceal said table and equipment, said tablecloth having at least a portion thereof which can be moved aside by a cat to provide an entrance to said opening and will automatically close the entrance after a cat travels either way therethrough.

18. In combination: a support having a framework constructed to provide an unobstructed central area and equipment for cat litter confined in said area; said equipment comprising a bag having an open top detachably secured to said framework at four locations for supporting said bag in an upright condition in said area, means for detachably connecting said bag at another location for additionally supporting it in an upright condition, said bag being adapted to contain a receptacle and litter and having an opening affording a cat access to such a receptacle, the arrangement being such that when said bag is unsupported said means may be used to hold litter and excrement wrapped up in the bag for disposal.

* * * * *